US012637059B2

(12) United States Patent
Diamond et al.

(10) Patent No.: US 12,637,059 B2
(45) Date of Patent: May 26, 2026

(54) ADAPTIVE ENERGY MANAGEMENT CONTROLS FOR HYBRID POWERTRAIN

(71) Applicant: FORD GLOBAL TECHNOLOGIES, LLC, Dearborn, MI (US)

(72) Inventors: Brendan F. Diamond, Naples, FL (US); Alec Bolthouse, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 18/809,801

(22) Filed: Aug. 20, 2024

(65) Prior Publication Data

US 2026/0054714 A1    Feb. 26, 2026

(51) Int. Cl.
B60W 20/15        (2016.01)
B60W 10/26        (2006.01)

(52) U.S. Cl.
CPC ............ B60W 20/15 (2016.01); B60W 10/26 (2013.01); *B60W 2510/244* (2013.01); *B60W 2710/0666* (2013.01); *B60W 2710/083* (2013.01)

(58) Field of Classification Search
CPC ................. B60W 20/15; B60W 10/26; B60W 2510/244; B60W 2710/0666; B60W 2710/083
See application file for complete search history.

(56) References Cited

U.S. PATENT DOCUMENTS

| | | | |
|---|---|---|---|
| 9,248,756 B2 * | 2/2016 | Chen ......................... | H02J 7/04 |
| 11,267,453 B1 | 3/2022 | Bolthouse et al. | |
| 11,535,235 B2 | 12/2022 | Pan et al. | |
| 11,708,007 B2 | 7/2023 | Yeakle et al. | |
| 2015/0274156 A1 * | 10/2015 | Phillips ................. | B60W 50/10 180/65.265 |
| 2017/0197611 A1 | 7/2017 | Yamazaki et al. | |

FOREIGN PATENT DOCUMENTS

CN        114643975 A        6/2022

* cited by examiner

*Primary Examiner* — Donald J Wallace
(74) *Attorney, Agent, or Firm* — David B. Kelley; Brooks Kushman P.C.

(57)        ABSTRACT

A hybrid vehicle includes a powertrain having an engine, an electric machine, and a disconnect clutch configured to selectively couple the engine and the electric machine. The vehicle further includes a controller programmed to, for a given operating point defined by a powertrain speed and a driver-demanded torque, command a torque split between the engine and the electric machine that depends on a duration of time of the powertrain having been at the given operating point in a previous drive cycle such that for consecutive drive cycles, as the durations of time decrease, torque commanded to the engine decreases and torque commanded to the electric machine increases.

20 Claims, 5 Drawing Sheets

ADAPTIVE ENERGY MANAGEMENT CONTROLS FOR HYBRID POWERTRAIN

TECHNICAL FIELD

This application generally relates to energy management of hybrid vehicles.

BACKGROUND

A hybrid-electric vehicle includes a traction battery constructed of multiple battery cells in series and/or parallel. The traction battery provides power for vehicle propulsion and accessory features. During operation, the traction battery may be charged or discharged based on the operating conditions including a battery state of charge (BSOC), driver demand, and regenerative braking.

SUMMARY

According to one embodiment, a hybrid vehicle includes a powertrain having an engine, an electric machine, and a disconnect clutch configured to selectively couple the engine and the electric machine. The vehicle further includes a controller programmed to, for a given operating point defined by a powertrain speed and a driver-demanded torque, command a torque split between the engine and the electric machine that depends on a duration of time of the powertrain having been at the given operating point in a previous drive cycle such that for consecutive drive cycles, as the durations of time decrease, torque commanded to the engine decreases and torque commanded to the electric machine increases.

According to another embodiment, a hybrid vehicle powertrain includes a controller programmed to, for a given operating point defined by a powertrain speed and a driver-demanded torque, command a torque split between an engine and an electric machine that depends on a duration of time of the powertrain having been at the given operating point in a previous drive cycle such that for consecutive drive cycles, as the durations of time increase, torque commanded to the engine increases and torque commanded to the electric machine decreases.

According to yet another embodiment, a method of controlling a hybrid powertrain includes, for a given operating point defined by a powertrain speed and a driver-demanded torque, commanding a torque split between an engine and an electric machine that depends on a duration of time of the powertrain having been at the given operating point in a previous drive cycle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
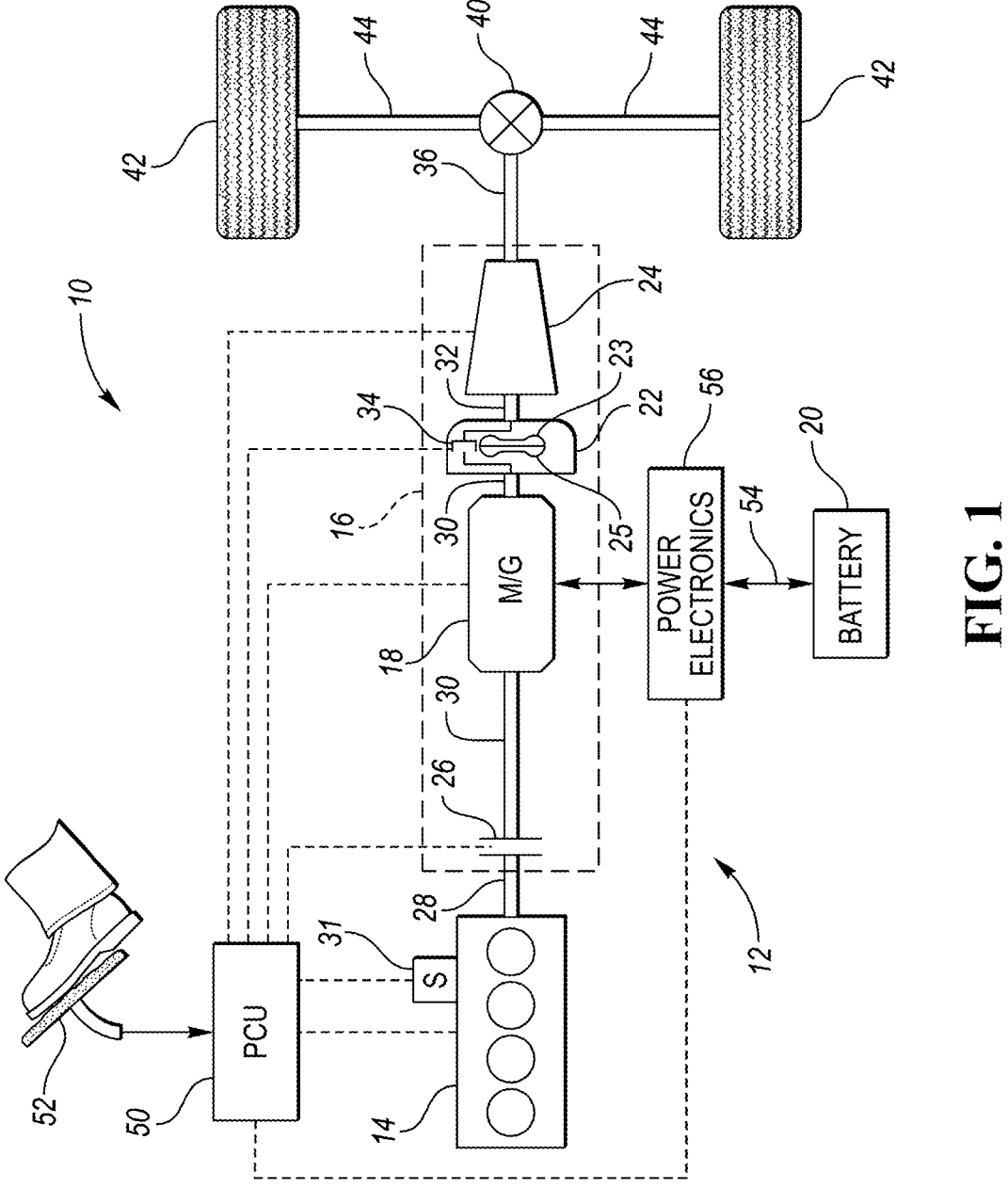
FIG. 1 is a schematic of a hybrid electric vehicle according to one embodiment.

Referring to FIG. 1, a schematic diagram of a hybrid-electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural gas powered engine. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, the M/G 18 may be a permanent magnet synchronous motor. Power electronics condition direct current (DC) power provided by the battery 20 to the requirements of the M/G 18, as described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine 14 is started, the starter motor 31 can be disengaged from the engine 14 via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine 14 disconnected with the M/G 18. Once the engine 14 has started and is brought up to speed with the M/G 18, the disconnect clutch 26 can couple the engine 14 to the M/G 18 to allow the engine 14 to provide drive torque.

In another embodiment, the starter motor 31 is not provided and, instead, the engine 14 is started by the M/G 18. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 25 fixed to a transmission input shaft 32. The torque converter 22 provides a hydraulic coupling between shaft 30 and transmission input shaft 32. The torque converter 22 transmits power from the impeller 23 to the turbine 25 when the impeller 23 rotates faster than the turbine 25. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller 23 and the turbine 25 of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential 40 transmits approximately equal torque to each wheel 42 while permitting slight speed differences such as when the vehicle 10 turns a corner. Different types of differentials or similar devices may be used to distribute torque from the powertrain to one or more wheels. In some applications, torque distribution may vary depending on the particular operating mode or condition, for example.

The powertrain 12 further includes one or more controllers 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 50 in controlling the vehicle 10.

The controller 50 communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller 50 include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), deceleration or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle 10 to provide a demanded torque, power, or drive command to propel the vehicle 10. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal 52, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller 23 and the turbine 25. Alternatively, the torque converter bypass clutch 34 may be operated as locked or open without using a modulated operating mode depending on the particular application.

To drive the vehicle 10 with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle 10 with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The traction battery 20 may be constructed from a variety of chemical formulations. Typical battery pack chemistries may be lead acid, nickel-metal hydride (NIMH) or Lithium-Ion. A battery management system may have a one or more controllers, such as a Battery Energy Control Module (BECM) that monitors and controls the performance of the traction battery. The BECM may include sensors and circuitry to monitor several battery pack level characteristics such as pack current, pack voltage and pack temperature. The BECM may have non-volatile memory such that data may be retained when the BECM is in an off condition. Retained data may be available upon the next key cycle.

In addition to the pack level characteristics, there may be battery cell level characteristics that are measured and monitored. For example, the terminal voltage, current, and temperature of each cell may be measured. The battery management system may use a sensor module to measure the battery cell characteristics. Depending on the capabilities, the sensor module may include sensors and circuitry to measure the characteristics of one or multiple of the battery cells. The battery management system may utilize sensor modules or Battery Monitor Integrated Circuits (BMIC) to measure the characteristics of all the battery cells. Each sensor module may transfer the measurements to the BECM for further processing and coordination. The sensor module may transfer signals in analog or digital form to the BECM. In some embodiments, the sensor module functionality may be incorporated internally to the BECM. That is, the sensor module hardware may be integrated as part of the circuitry in the BECM and the BECM may handle the processing of raw signals. The BECM may include circuitry to interface with the one or more contactors. The positive and negative terminals of the traction battery 20 may be protected by contactors.

Battery state of charge (SOC) gives an indication of how much charge remains in the battery cells or the battery pack 20. The battery pack SOC may be output to inform the driver of how much charge remains in the battery pack 20, similar to a fuel gauge. The battery pack SOC may also be used to control the operation of an electric or hybrid-electric vehicle 10. Calculation of battery pack SOC can be accomplished by a variety of methods. One possible method of calculating battery SOC is to perform an integration of the battery pack current over time. This is well-known in the art as ampere-hour integration.

Battery SOC may also be derived from a model-based estimation. The model-based estimation may utilize cell voltage measurements, the pack current measurement, and the cell and pack temperature measurements to provide the SOC estimate, which may also be referred to as calculated SOC or actual SOC.

The BECM may have power available at all times. The BECM may include a wake-up timer so that a wake-up may be scheduled at any time. The wake-up timer may wake up the BECM so that predetermined functions may be executed. The BECM may include non-volatile memory so that data may be stored when the BECM is powered off or loses power. The non-volatile memory may include Electrical Erasable Programmable Read Only Memory (EEPROM) or Non-Volatile Random Access Memory (NVRAM). The non-volatile memory may include FLASH memory of a microcontroller.

Figure 2:
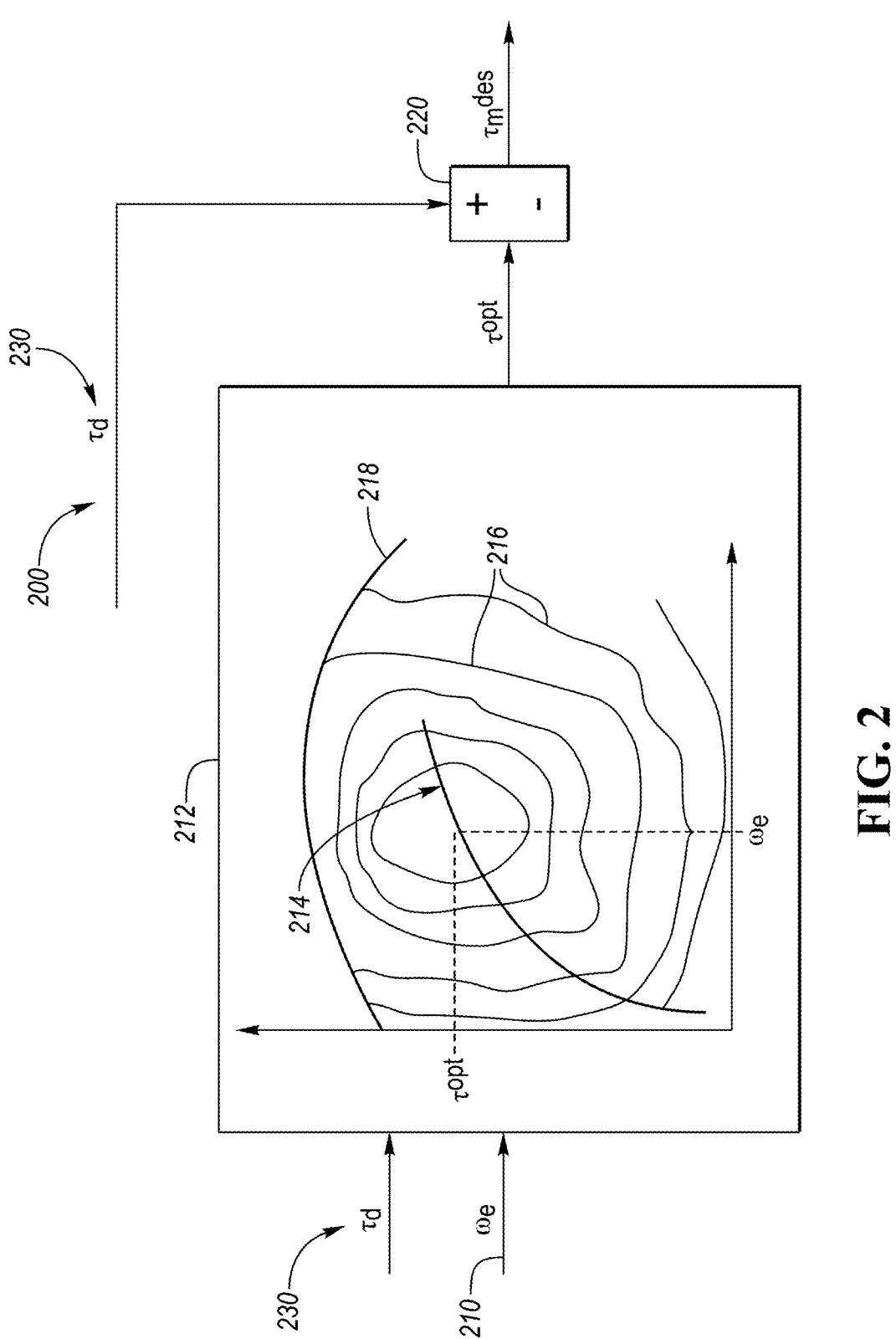
FIG. 2 is a schematic representation of a lookup table for controlling engine and electric machine torque.

Referring to FIGS. 1 and 2, control logic and a representative lookup table for controlling engine 14 and M/G 18 is illustrated. A driver-demanded torque request $\tau_d$ 230 is received as indicated at 200. The driver-demanded torque request $\tau_d$ 230 is equivalent to a driver-power request divided by a current vehicle speed. The driver-power request 230 may correspond to position of an accelerator pedal 160, or may be generated automatically by the controller 50 or another controller, such as when operating in cruise control, or when applied to an autonomous vehicle. A current engine speed $\omega_e$ (e.g., RPM) is also received as indicated at 210. Engine speed may be used as a powertrain speed in some embodiments. A corresponding engine torque $\tau^{opt}$ for the current engine speed $\omega_e$ and driver-demanded torque 230 is obtained at operation 212 to achieve a desired system operating goal, such as minimizing engine fuel consumption, minimizing instantaneous or long-term battery depletion, maximizing instantaneous or long-term system efficiency, etc. Operation 212 may include retrieving a value from a lookup table stored in memory that represents a desired characteristic curve 214 calibrated to provide an engine torque $\tau^{opt}$ for the desired characteristic at a given engine speed $\omega_e$ where the engine speed is determined based on current vehicle speed and transmission gear ratio. The desired characteristic may be, for example, peak system efficiency or lowest fuel consumption or lowest system losses, for example. The desired characteristic could also include reduced emissions, or various other characteristics, or a combination of characteristics.

For purposes of illustration, operation 212 is represented as a chart having operating zones of the engine 14 including a plurality of system efficiency contours 216 bounded by a maximum engine torque curve 218. The desired characteristic curves and contours may be calibrated through vehicle testing, computer simulation, or other methods as appropriate. If the desired characteristic is system efficiency, the efficiency curves and contours will depend on an engine brake specific fuel consumption, motor efficiency map, battery state-of-charge (SOC), powertrain efficiency, and other factors. The operation may be embodied in one or more lookup tables, equations, algorithms, or other methods. The selected engine torque $\tau^{opt}$ to approach or achieve the desired characteristic is then provided to operation 220. At operation 220, the difference between the engine torque $\tau^{opt}$ associated with the selected engine operating point and the driver-torque request $\tau_d$ 230 is determined. The resulting difference is the desired electric machine torque as represented by $\tau_m^{des}$. The engine 14 will be commanded to provide a desired engine torque $\tau_e^{des}$ equal to $\tau^{opt}$, and the M/G 18 will be commanded to provide a torque equal to $\tau_m^{des}$.

Commanding the engine to provide the desired engine torque may include control of various vehicle systems or actuators depending on the particular type of engine. For example, for a spark-ignited gasoline engine, the controller may control a throttle valve to control vacuum or intake manifold airflow, spark ignition timing, fuel injection metering and timing, etc. For a compression-ignition diesel engine, the controller may control fuel injection metering and timing, etc. Commanding the electric machine to provide a desired energy management torque may include controlling current supplied from the battery to the electric machine operating as a motor to increase output torque, or controlling current supplied to the battery from the electric machine operating as a generator to decrease output torque.

However, because the traction battery is of finite size, the magnitude and duration of the electric machine or energy management torque is limited by the battery power capability and current SOC. As such, given a powertrain speed and driver requested or demand torque, the most efficient operating point for the system is influenced by the duration for which the battery can maintain the requested EM torque. For example, if the most efficient operating point is one that charges the battery aggressively, but the battery SOC is close to its maximum limit, then the subsequent powertrain operating point after reaching maximum SOC may be significantly less efficient than the initial point chosen. This can lead to a series of alternating operating points resulting in overall inefficient use of HV battery and fuel over the duration of a driving maneuver. Therefore, the selected engine operating point as described with reference to FIG. 2 may be adjusted or modified based on the battery state-of-charge (SOC) and whether the driver-demanded torque and powertrain speed are in transient or steady-state operation.

In one or more embodiments, lookup tables similar to that represented in FIG. 2 are provided to specify an electric-machine torque with a first lookup table for transient operation and a second lookup table for steady-state operation. Rather than using engine speed as an index or input parameter, the electric machine torque lookup tables select or determine a desired electric machine torque based on torque converter impeller speed and driver-demanded torque with the particular lookup table selected based on steady state or transient operation. The steady state lookup table is calibrated to minimize long term system energy losses by considering the finite charge storage capacity of the battery, whereas the transient operation lookup table is calibrated to minimize instantaneous system losses.

Figure 3:
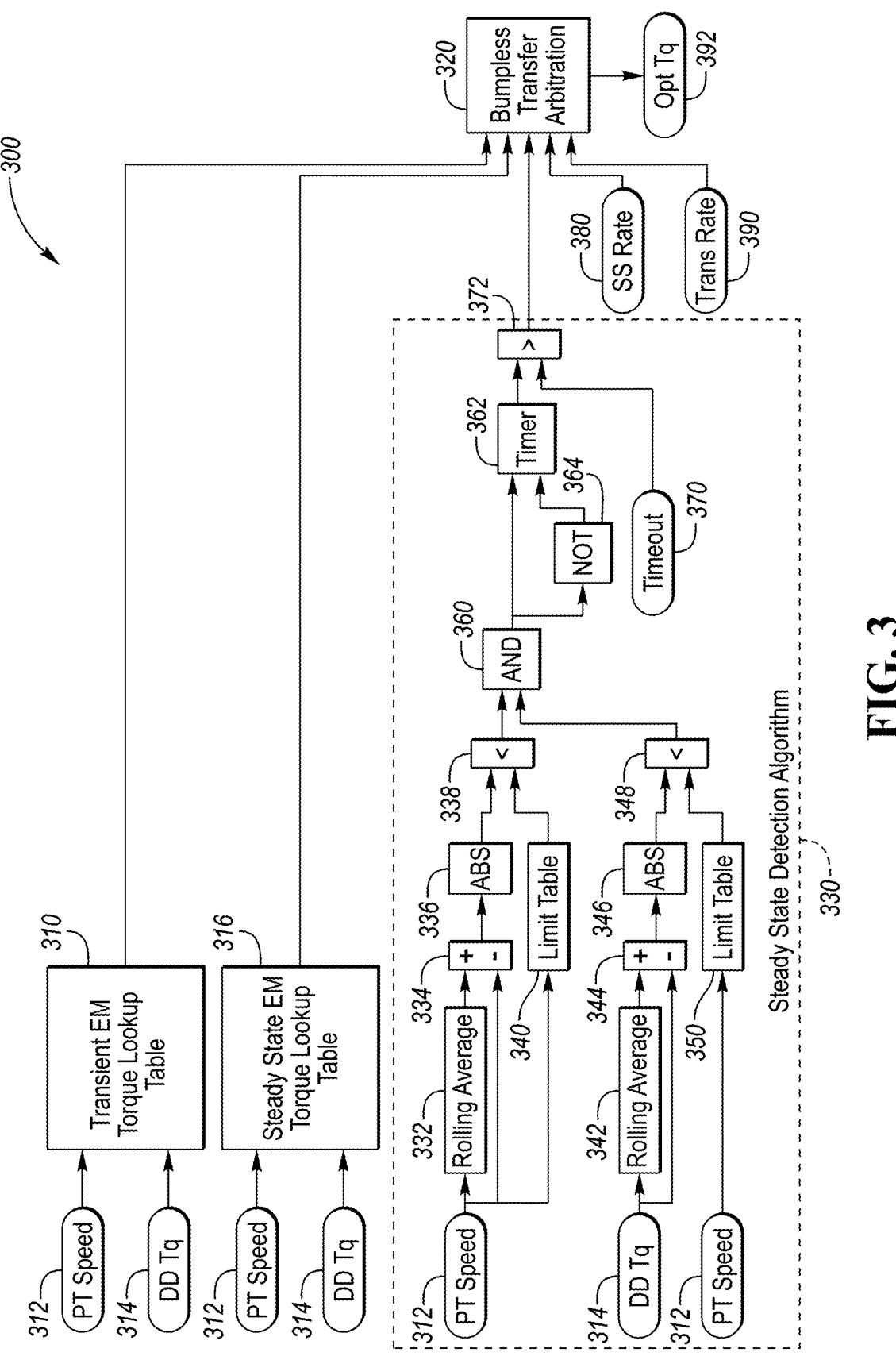
FIG. 3 is a control diagram for determining if the vehicle powertrain is at transient or steady-state conditions and for determining a torque split between an engine and an electric machine.

FIG. 3 is a block diagram illustrating operation of a system or method for detecting steady state operation and controlling the transition from transient to steady state EM torque control. Control strategy or logic 300 includes a transient operation lookup table 310 that outputs an electric-machine torque target or desired operating point based on a current powertrain speed 312 and a driver-demanded torque 314. The transient operation lookup table 310 may include values that minimize instantaneous system losses. A steady-state operation lookup table 316 is accessed to retrieve or select a corresponding electric machine torque target or desired operating point based on the current powertrain speed 312 and driver-demanded torque 314. The steady state operation lookup table 316 may include values determined to minimize long term system energy losses by considering the finite charge storage capacity and current SOC of the traction battery. The electric machine torque retrieved from lookup tables 310, 316 is provided to a bumpless transfer arbitration strategy or function 320 that determines an optimal output torque 392 for the electric machine and engine based on inputs from blocks 310, 316, 372, 380, and 390 as described in greater detail below.

Logic or algorithm 330 detects steady state operation based on driver-demanded torque 314 and powertrain speed 312 changing less than an associated threshold for a calibratable predetermined time period. A rolling average of the powertrain speed 312 is calculated at 332 and compared to a current instantaneous value of the powertrain speed 312 at 334. The rolling average may have a calibratable time constant that determines the number of samples or amount of time associated with the values that form the rolling average. The rolling average 332 may be a weighted average with more recent values weighted more than older values depending on the particular application. Other statistical operations or functions may be applied to the powertrain speed values to provide an indication of a rate of change or magnitude of change over a predetermined time period. The absolute value of the difference 334 between the rolling average 332 and current powertrain speed 312 is determined at 336 and compared at 338 to an associated calibratable threshold or limit 340. Steady-state powertrain speed is indicated when the difference between the current value of powertrain speed 312 and the rolling average 332 is less than the threshold 340 with an output trigger or flag from block 338 provided to block 360.

A rolling average 342 of the driver-demanded torque 314 is calculated and compared to a current instantaneous value of the driver-demanded torque at 344. The rolling average may have a calibratable time constant that determines the number of samples or amount of time associated with the values that form the rolling average. The rolling average 342 may be a weighted average with more recent values weighted more than older values depending on the particular application. Other statistical operations or functions may be applied to the driver-demanded torque values to provide an indication of a rate of change or magnitude of change over a predetermined time period. The absolute value of the difference 344 between the rolling average 342 and current driver demanded torque 314 is determined at 346 and compared at 348 to an associated calibratable threshold or limit 350. Steady-state driver demanded torque is indicated when the difference 344 between the current value of driver-demanded torque 314 and the rolling average 342 is less than the associated limit or threshold 350 with an output trigger or flag from block 348 provided to block 360.

When powertrain speed 312 and driver-demanded torque 314 are both steady state as detected at block 360, a timer 362 (or a counter) is incremented. The timer 362 is reset or reinitialized by NOT input 364 when either powertrain speed or driver-demanded torque is not steady state, i.e., transient. Timer 362 is compared to an associated timeout threshold or limit 370 at 372. When steady state timer 362 exceeds the associated calibratable steady state time limit 370, a corresponding output or flag is provided by block 372 to arbitration logic or strategy 320 indicating that steady state operation has been detected.

A calibratable steady state transition rate 380 and a calibratable transient transition rate 390 are used by a bumpless transfer arbitration strategy 320 to control transitions between the electric machine torque targets selected or retrieved from transient operation lookup table 310 and steady state operation lookup table 316 in response to a change in steady-state operation detected by algorithm 330. The bumpless transfer arbitration strategy 320 determines the optimal electric machine torque 392 from lookup table 310 during transient operation, from lookup table 316 during steady state operation, and a target value between the transient and steady state target values subject to the transition rates 380, 390 when transitioning between steady state and transient operation.

Figure 4:
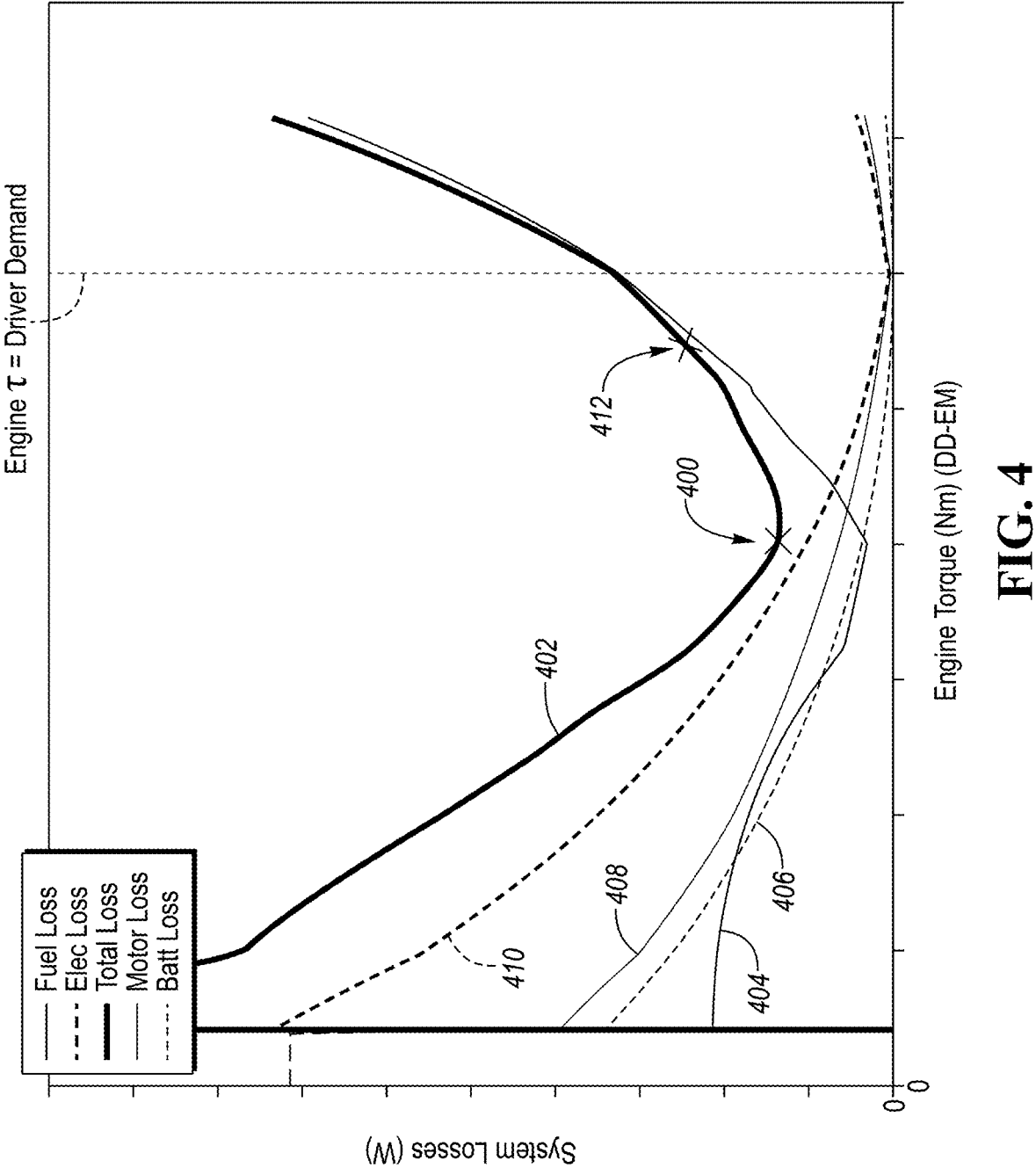
FIG. 4 shows plots of powertrain parameters for a given operating condition of the powertrain.

Referring to FIG. 4, in one or more embodiments, the vehicle 10 is configured to optimize efficiency during steady-state operation by adjusting the engine and electric machines torques towards the most efficient engine torque 400 (for a given operating point of the powertrain defined by a speed of the powertrain and a driver-demanded torque) using history data from previous drive cycles. FIG. 4 illustrates a plurality of plots of various parameters for a given powertrain speed 312 and driver-demanded torque 314. Trace 402 represents the total powertrain loss, trace 404 represents fuel energy loss of the engine due to inefficient operation, trace 406 represents battery loss, trace 408 represents electric machine loss, and trace 410 represents electric losses.

As discussed above, the electric machine 18 has limited torque and the battery 20 has a limited amount of energy. Therefore, it may not be possible to maintain the powertrain 12 at the optimum operating point 400 for very long because the battery 20 may become depleted. Point 412 is an operating point that balances prolonged usage with efficiency. That is, the vehicle 10 can be operated at point 412 for an extended period of time such as during steady-state conditions. The ability to operate the vehicle at point 412 comes with the trade-off that point 412 is less efficient than the most efficient operating point 400. Point 412 may be determined during vehicle development and represents a conservative value known to provide prolonged operation with reasonable efficiency. The vehicle may come preprogrammed with the engine torque of point 412 being the commanded engine torque when the vehicle is a the shown powertrain operating point. However, vehicle efficiency may be improved by shifting down the curve towards point 400 when the vehicle has a reasonable expectation that it can perform at that level for an appropriate amount of time.

The vehicle 10 is configured to receive a plethora of different data from onboard sensors as well as external sources. The data may include GPS data, map data, traffic data, weather data, historical use data, and many others. The vehicle 10 may include both hardware and software modules to enable use of this data. For example, the vehicle 10 may include a routing engine, a GPS module, and a map and navigation module. These modules are configured to send and receive signals between one another in order to accomplish select functionalities of the vehicle 10. The vehicle 10 may also include a vision system having a plurality of sensors that inspect an area surrounding the vehicle 10. The vision system may employ radar, LIDAR, cameras, ultrasound, or sonar, and any combination thereof.

The map data may include information such as road grade and speed limits for segments of the road. Road grade refers to slope or change in elevation, i.e., the angle between the road and earth's horizontal plane. The road grade may be expressed as a percentage or decimal. The road grade may be inclined, e.g., uphill, or declined, e.g., downhill. An uphill grade may be expressed as a positive percentage or decimal and a downhill grade may be expressed as a negative percentage or decimal.

Using this data, a machine learning algorithm of the controller adjusts the point 412 towards point 400 using history data. That is, data from previous drive cycle indicating the amount of time the drive stays at a given powertrain operating point (powertrain speed, driver demanded torque). For example, the learning algorithm may determine how long the user typically stays at a given operating point and using closed-loop feedback controls shifts the commanded engine torque from the default, preprogrammed steady-state point 412 towards the optimum point 400. That is, the vehicle 10 may include a hybrid adaptive energy management torque feature for steady-state efficiency optimization that will adaptively determine what the steady-state operating conditions should be for a given driver-demand operating condition (i.e., engine/transmission input speed and driver-demanded torque) as part of the energy management strategy to maximize powertrain system efficiency when steady-state conditions are present. To accomplish this functionality, the following example methods may be used.

During vehicle usage and during vehicle development, the vehicle 10 will determine historical usage of the powertrain operating system at various vehicle speeds, transmission input speeds, and driver-demand torques for various different usages.

Different usages can be based on vehicle weight, presence of a trailer, combined vehicle+trailer weight, route characteristics (speed, grade, etc.), driver behavior, and the like. Usage can also be estimated based on vehicle modeled data and route characteristics (grade, location of stop lights, highway on-ramps, etc.) as determined using electronic horizon data, vehicle-to-vehicle data, and/or vehicle to infrastructure communications.

From this powertrain usage data and from vehicle (e.g., dynamometer) mapping data, a true system instantaneous optimal powertrain operating calibration, e.g., 400 and a steady-state system operational point, e.g., 412, will be determined for various transmission input speeds and driver-demanded torques. (It could also be based on vehicle speed.)

As discussed above, the instantaneous optimal operational point may be used for quick transients to operate the system most efficiently while the steady-state operational point is used for a high efficiency operating condition that can be sustained for longer durations of time. During customer usage, the vehicle 10 may sample the usage of the powertrain system and determine the average and standard deviation of time spent at each operating condition while steady-state operation is realized. This usage sampling can be specific to the driver, vehicle weight, road conditions, and other usage specific inputs as described above.

The vehicle 10 may use this information to perform adaptive closed loop calibration and reposition the "Steady State" operational point closer to or further away from the optimal point, e.g., 400, by balancing and biasing the torque request for the electric motor 18 by the appropriate amount. The newly chosen point may be selected to ensure that the operating point can be maintained by the powertrain for at least the average amount of time, e.g., +X(1, 2, 3, etc.) standard deviations that has been determined from historical usage.

The calculation regarding how long a certain powertrain operating condition can be maintained may be predetermined by assuming an allowable energy buffer or it can be based on real time calculations of the remaining energy buffer in the HV battery, discharge/charge limits of the electric motor 18 and battery 20, and the expected discharge/charge rate of the powertrain 12 when meeting the requested driver-demand torque 230. That is, for example, if the electric motor 18 is performing X kW of discharge and there are Y kWh of a remaining energy buffer before a calibrated low battery SOC limit, this powertrain operating condition can be maintained for Z seconds. By performing this optimization, the powertrain 12 can operate as close to the ideal point, e.g., 400, and prevent frequent cycling between various powertrain operational conditions and torque splits which can increase fuel economy of the vehicle 10.

Figure 5:
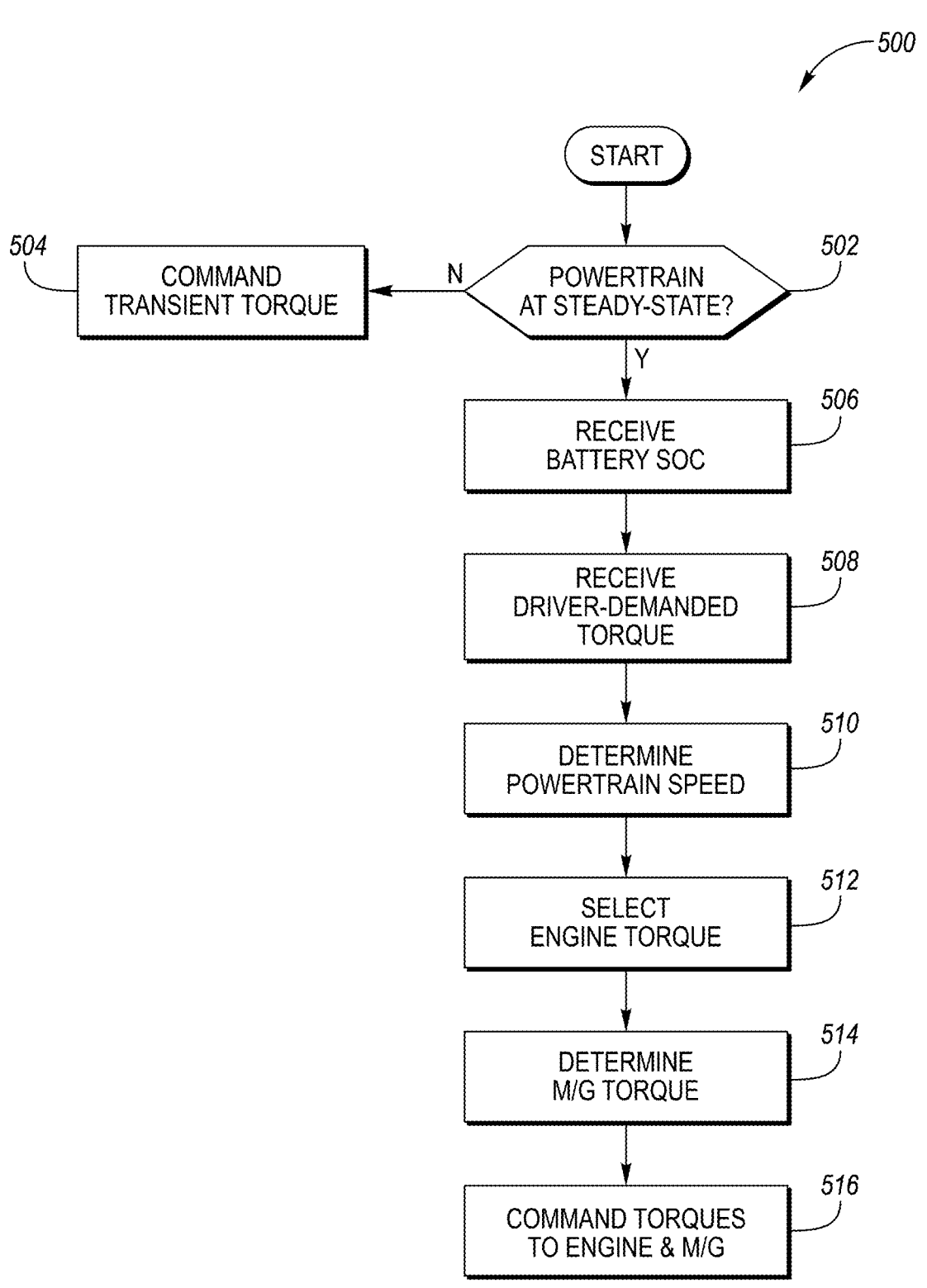
FIG. 5 is a flow chart of an algorithm for commanding torque to the engine and the electric machine based on adaptive energy management controls.

FIG. 5 is a flow chart 500 of an algorithm for controlling the powertrain of the vehicle 10. At operation 502, the controller 50 determines if the powertrain is a steady-state operating conditions. If no, control passes operation 504 the controller 50 commands transient torques to the electric machine 18 and the engine 14 as discussed above. If yes at operation 502, the controller 50 receives the battery state of charge at operation 506. The controller 50 also receives the driver demanded torque 230 and the powertrain speed at operations 508 and 510. As discussed above, the powertrain speed may be a measured speed of one of the components of the powertrain. For example, powertrain speed may be a measured speed of the electric machine 18 or a measured speed of the impeller 23 of the torque converter 22.

The controller 50 uses the received driver-demanded torque and powertrain speed to select the appropriate steady-state lookup table 316 that corresponds to those torques in speed at operation 512. As discussed above, the lookup table prescribes an engine torque to command for vehicle current operating point. As discussed above, the lookup table is derived from history data.

That is, the torque split values of engine/electric machine stored in the lookup table(s) are changed based on the duration of time of the powertrain having been at the given operating point in a previous drive cycle. For example, the controller is programmed to, for a given operating point defined by the powertrain speed and the driver-demanded torque, the controller increases the value for the electric machine torque and proportionally decreases the value of the engine torque in the lookup table when the driver has decreased the duration of time at the given operating point in a previous drive cycles. (This would result in the engine torque moving along curve 402 towards point 400.) The controller may be further programmed to change the torque split the other way when the driver has increased the duration of time at the given operating point.

The lookup table may also account for the battery state of charge or the battery state of charge may be accounted for the separate stack. For example, the controller may select an engine torque from the lookup table and then determine if the current battery state of charge is sufficient to provide that torque for a meaningful amount of time. If yes, the controller may use the engine torque from the lookup table or, if no, may increase the engine torque based on the battery state of charge. In this way, the lookup table provides an engine torque predetermined to allow a state of charge of the battery to remain above a threshold SOC (lower limit) for a threshold period of time.

At operation 514, the controller 50 determines the torque to command to the electric machine 18 based on the received driver demanded torque and the engine torque selected at operation 512. For example, the electric machine torque may be equal to the driver-demanded torque minus the engine torque. Of course, a gain, offset, or a scaler may also be used in the calculation to account for losses or inaccuracies of the powertrain 12. At operation 516, the controller 50 commands the torques to the engine 14 and the electric machine 18.

As discussed above, the vehicle 10 is changing and adapting the steady-state torque value relative to the instantaneous system optimal value based on historical data indicating how long the vehicle 10 is operating at a the steady-state operational point. This allows the steady-state torque value to become closer to the instantaneous system optimal value. The following is a nonlimiting example to aid understanding of how the vehicle is adapting the steady-state torque. In this example, assume the engine is operating at 1500 RPM with 300 Nm of driver-demand torque. At this operating point, the instantaneous system optimal operation is 200 Nm engine torque and 100 Nm electric motor torque, and the steady-state default calibration (prior to adaption) is 270 Nm engine torque, 30 Nm electric motor torque. In this example, vehicle can operate at the instantaneous system optimal point for 60 s based on the energy capacity of the HV battery at this moment in time or the calibration could "assume" a max time this point could be supported irrespective of battery energy. However, historically, the driver only operates at this point (1500 RPM with 300 Nm of driver-demand torque) for 20 seconds. This results in an error of 40 seconds. (Error=default calibration (60)–historical average (20).) As such, the vehicle will adjust "steady state" electric motor torque request based on an "error" of 40 seconds. The new calibration value for electric motor torque for this operating point is equal to the previous values electric motor torque request value plus a calibrated gain, e.g., 0.1. This gain can be a function of torque, powertrain speed, vehicle speed. The new electric machine torque request can be calculated by the default value–gain*error. Or, in this example, is equal to 270–0.1*40=266 Nm. This value can be stored in the above-described lookup table of operation 512. This value may be periodically updated based on driving history data. That is, the vehicle may continuously adapt the lookup table as new data is collected. As can be seen from the above example, the engine torque is reduced in lieu of greater motor torque, thus improving fuel economy.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
a powertrain including an engine, an electric machine, and a disconnect clutch configured to selectively couple the engine and the electric machine; and
a controller programmed to, for a given operating point defined by a powertrain speed and a driver-demanded torque, command a torque split between the engine and the electric machine that depends on a duration of time of the powertrain having been at the given operating point in a previous drive cycle such that for consecutive drive cycles, as the durations of time decrease, torque commanded to the engine decreases and torque commanded to the electric machine increases.

2. The hybrid vehicle of claim 1, wherein the controller is further programmed to, as the durations of time increase, the torque commanded to the engine increases and the torque commanded to the electric machine decreases.

3. The hybrid vehicle of claim 1, wherein the controller is further programmed to command the torque split between the engine and the electric machine based on predefined values when data from previous drive cycles is unavailable.

4. The hybrid vehicle of claim 1, wherein the controller is further programmed to inhibit the increase in the torque commanded to electric machine and inhibit the decrease in the torque commanded to the engine in response to a battery state-of-charge being less than a threshold.

5. The hybrid vehicle of claim 1, wherein the controller is further programmed to, in response to a battery state-of-charge being less than a threshold, the torque commanded to the engine increases and the torque commanded to the electric machine decreases, wherein the threshold is based on the duration of time of the powertrain being at the given operating point in the previous drive cycle.

6. The hybrid vehicle of claim 1, wherein the torque commanded to the engine decreases and the torque commanded to the electric machine increases further in response to changes in the powertrain speed remaining less than a speed threshold while changes in the driver-demanded torque remain less than a torque threshold.

7. The hybrid vehicle of claim 6, wherein the controller is further programmed to, in response to changes in the powertrain speed exceeding the speed threshold while changes in the driver-demanded torque exceed the torque threshold, decrease the torque commanded to the engine and increase torque commanded to the electric machine.

8. The hybrid vehicle of claim 7, wherein rates of change of the decrease in the torque commanded to the engine and the increase in the torque commanded to the electric machine are limited based on calibratable rate limits.

9. The hybrid vehicle of claim 1, wherein the controller is further programmed to calculate an average time spent at the operating point based on the previous drive cycle and update the torque split for the operating point based on the average time.

10. The hybrid vehicle of claim 9, wherein the update of the torque split for the operating point is further based on a standard deviation of the time spent at the operating point.

11. The hybrid vehicle of claim 1 further comprising a sensor configured to measure the powertrain speed.

12. The hybrid vehicle of claim 1 further comprising a torque converter operably coupled to the electric machine and including an impeller, wherein the powertrain speed is a measured speed of the impeller.

13. The hybrid vehicle of claim 1, wherein the powertrain speed is a measured speed of the electric machine.

14. The hybrid vehicle of claim 1, wherein the decreases in the torque commanded to the engine are proportional to the increases in the torque commanded to the electric machine.

15. A hybrid vehicle powertrain comprising:
a controller programmed to, for a given operating point defined by a powertrain speed and a driver-demanded torque, command a torque split between an engine and an electric machine that depends on a duration of time of the powertrain having been at the given operating point in a previous drive cycle such that for consecutive drive cycles, as the durations of time increase, torque commanded to the engine increases and torque commanded to the electric machine decreases.

16. The hybrid vehicle powertrain of claim 15, wherein the controller is further programmed to, as the durations of time decrease, the torque commanded to the engine decreases and the torque commanded to the electric machine increases.

17. The hybrid vehicle powertrain of claim 16, wherein the controller is further programmed to inhibit the increase in the torque commanded to the engine and inhibit the decrease in the torque commanded to electric machine in response to a battery state-of-charge being less than a threshold.

18. The hybrid vehicle powertrain of claim 15, wherein the controller is further programmed to command the torque split between the engine and the electric machine based on predefined values when data from previous drive cycles is unavailable.

19. The hybrid vehicle powertrain of claim 15 further comprising:
an engine;
an electric machine; and
a disconnect clutch configured to selectively couple the engine and the electric machine.

20. A method of controlling a hybrid powertrain comprising:
for a given operating point defined by a powertrain speed and a driver-demanded torque, commanding a torque split between an engine and an electric machine that depends on a duration of time of the powertrain having been at the given operating point in a previous drive cycle.

* * * * *